(12) United States Patent
Yano

(10) Patent No.: US 9,098,748 B2
(45) Date of Patent: Aug. 4, 2015

(54) OBJECT DETECTION APPARATUS, OBJECT DETECTION METHOD, MONITORING CAMERA SYSTEM AND STORAGE MEDIUM

(75) Inventor: Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 941 days.

(21) Appl. No.: 13/267,455

(22) Filed: Oct. 6, 2011

(65) Prior Publication Data

US 2012/0092495 A1    Apr. 19, 2012

(30) Foreign Application Priority Data

Oct. 15, 2010    (JP) ................. 2010-232786

(51) Int. Cl.
*H04N 7/18* (2006.01)
*G06K 9/00* (2006.01)
(52) U.S. Cl.
CPC .................. *G06K 9/00771* (2013.01)
(58) Field of Classification Search
CPC ............... H04N 7/181; H04N 7/183
See application file for complete search history.

(56) References Cited

U.S. PATENT DOCUMENTS

| 7,699,423 | B2 | 4/2010 | Suwa et al. | |
| 2004/0119848 | A1* | 6/2004 | Buehler | 348/239 |
| 2006/0160616 | A1* | 7/2006 | Kato et al. | 463/30 |
| 2008/0130948 | A1* | 6/2008 | Ozer | 382/103 |

FOREIGN PATENT DOCUMENTS

| JP | 2001-243475 A | 9/2001 |
| JP | 2002-024808 A | 1/2002 |
| JP | 2006-107457 A | 4/2006 |
| JP | 2007-299250 A | 11/2007 |

OTHER PUBLICATIONS

U.S. Appl. No. 13/224,026, filed Sep. 1, 2011, Applicant: Yano.
Dalley, et al., "Background Subtraction for Temporally Irregular Dynamic Textures", Workshop on Applications of Computer Vision, Jan. 2008.
Japanese Office Action issued on Jul. 14, 2014, corresponding to Japanese Patent Application No. 2010-232786.

\* cited by examiner

*Primary Examiner* — Sath V Perungavoor
*Assistant Examiner* — Kate Luo
(74) *Attorney, Agent, or Firm* — Fitzpatrick, Cella, Harper & Scinto

(57) ABSTRACT

An object detection apparatus comprising: an extraction unit adapted to extract a feature amount for each of partial regions that constitute image data; a storage unit adapted to store, as a background feature amount for each of the partial regions, a feature amount extracted in advance from background image data and does not include the target object; a first determination unit adapted to determine whether or not the partial region is an object region including the target object by comparing a current feature amount extracted from the partial region with the background feature amount; a deciding unit adapted to decide a parameter for each of the partial regions based on a plurality of results of determination; and a second determination unit adapted to determine whether or not the partial region is the object region based on the parameter and the results of determination.

12 Claims, 6 Drawing Sheets

OBJECT DETECTION APPARATUS, OBJECT DETECTION METHOD, MONITORING CAMERA SYSTEM AND STORAGE MEDIUM

BACKGROUND OF THE INVENTION

1. Field of the Invention

The present invention relates to an object detection apparatus, an object detection method, a monitoring camera system, and a storage medium, and in particular to an object detection apparatus that detects a predetermined object from an image captured by an image capturing apparatus such as a camera, an object detection method, a monitoring camera system, and a storage medium.

2. Description of the Related Art

In recent years, the installation of monitoring cameras has become rapidly prevalent for the sake of security. Further, an apparatus that automatically detects the intrusion of a suspicious person or object using such a camera has been proposed. As technology applicable for such an object detection function, a method is known in which a scene that does not contain an intruder is shot in advance as a background image, and an object region, in which an intruder appears, is detected based on the difference between an input image and the background image.

However, a problem arises in that a background portion is incorrectly detected in addition to detecting an intrusion by a person or object for a scene in which leaves are swaying or ripples are being caused on the water surface in the background. In order to solve such a problem, Japanese Patent Laid-Open No. 2006-107457 proposes a method for determining whether leaves are swaying based on a temporal change in the difference between an input image and a background image. Further, a method for distinguishing between an intrusion of an object and disturbance by comparison not only with a background image corresponding to an input image, but also with a neighboring background model has been proposed by Dalley, Migdal, and Grimson in "Background Subtraction for Temporally Irregular Dynamic Textures", Workshop on Applications of Computer Vision, January 2008.

However, parameters for determination must be decided in order to precisely detect an object and distinguish between the object and a disturbance in the conventional example. On the other hand, a problem exists that although such parameter values depend on the scene in which a camera is installed, a method to easily set the appropriate values has not been proposed.

In light of the above problems, the present invention provides technology to precisely distinguish between an object and disturbance by setting optimal parameters for a scene in which a camera is installed.

SUMMARY OF THE INVENTION

According to one aspect of the present invention, there is provided an object detection apparatus that detects a target object from image data, the apparatus comprising: an image obtaining unit adapted to obtain image data by capturing an image in a predetermined direction from a predetermined viewpoint; feature extraction unit adapted to extract a feature amount for each of partial regions that constitute the image data obtained by the image obtaining unit; storage unit adapted to store, as a background feature amount for each of the partial regions, a feature amount extracted in advance by the feature extraction unit from background image data that has been obtained by the image obtaining unit and does not include the target object; first object region determination unit adapted to determine, for each of the partial regions, whether or not the partial region is an object region including the target object by comparing a current feature amount extracted from the partial region by the feature extraction unit with the background feature amount; parameter deciding unit adapted to decide a parameter for each of the partial regions based on a plurality of results of determination by the first object region determination unit; and a second object region determination unit adapted to determine, for each of the partial regions, whether or not the partial region is the object region based on the parameter decided by the parameter deciding unit and the results of determination by the first object region determination unit.

According to one aspect of the present invention, there is provided an object detection method for an object detection apparatus that detects a target object from image data, the method comprising: an obtaining step of obtaining image data by capturing an image in a predetermined direction from a predetermined viewpoint; an extracting step of extracting a feature amount for each of partial regions that constitute the image data obtained in the obtaining step; storing step of storing, as a background feature amount for each of the partial regions, a feature amount extracted in advance in the feature extraction from background image data that has been obtained in the obtaining step and does not include the target object; a first determining step of determining, for each of the partial regions, whether or not the partial region is an object region including the target object by comparing a current feature amount extracted from the partial region in the extracting step with the background feature amount; a parameter deciding step of deciding a parameter for each of the partial regions based on a plurality of results of determination in the first determining step; and a second determining step of determining, for each of the partial regions, whether or not the partial region is the object region based on the parameter decided in the deciding step and the results of determination in the first determining step.

Further features of the present invention will be apparent from the following description of exemplary embodiments with reference to the attached drawings.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
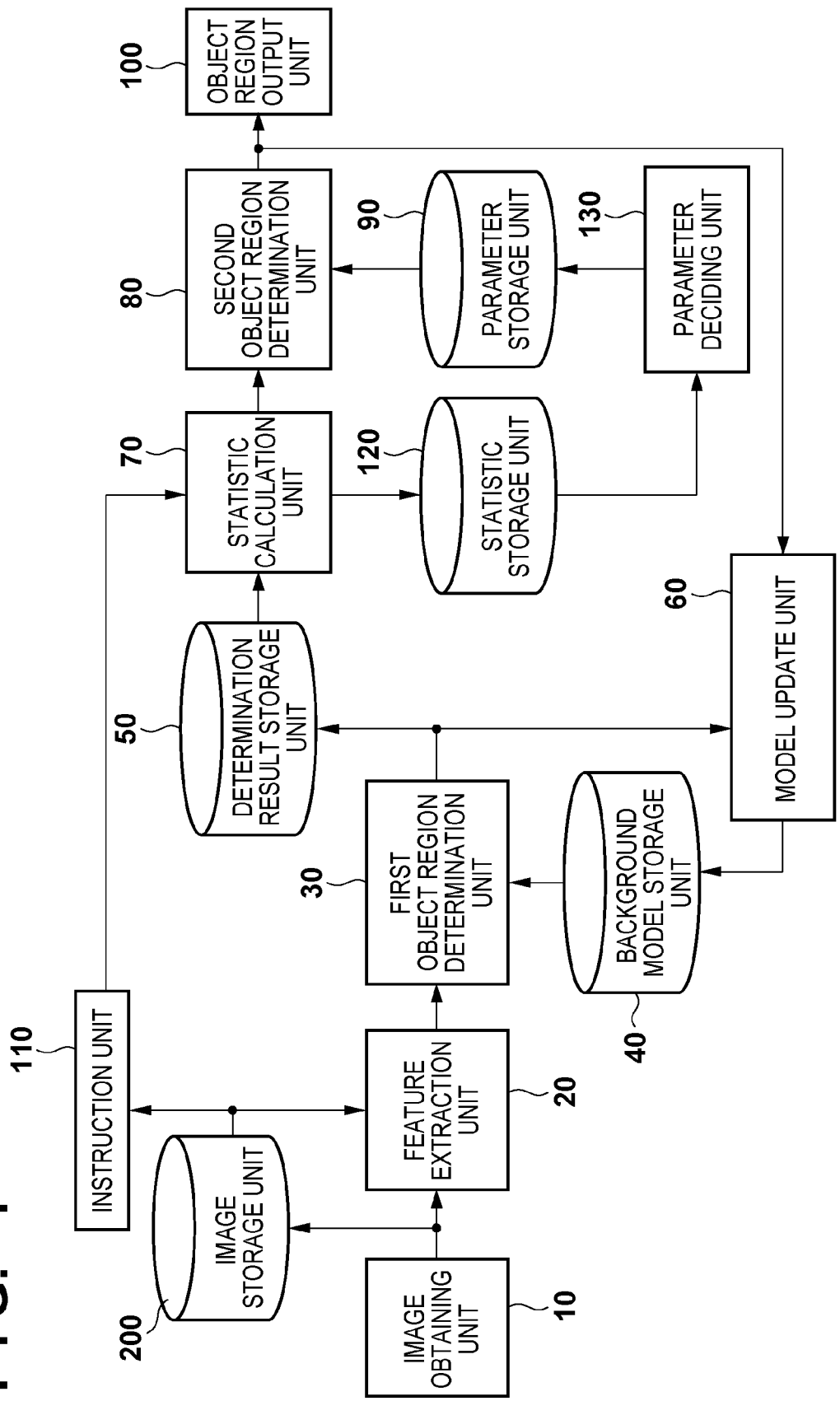
FIG. 1 is a diagram showing a functional configuration of an object detection apparatus according to a first embodiment.

The functional configuration of an object detection apparatus according to a first embodiment will be described below with reference to FIG. 1. An image obtaining unit 10 obtains image data by performing continuous capturing in a predetermined direction from a predetermined viewpoint using an image capturing unit such as a video camera. A feature extraction unit 20 extracts, for each partial region, a feature amount from image data of frames obtained by the image obtaining unit 10. A first object region determination unit 30 compares a feature amount extracted by the feature extraction unit 20 with a background feature amount stored in a background model storage unit 40, and determines whether or not a partial region whose feature amount has been extracted is an object region. The background model storage unit 40 stores, as a reference model, background feature amounts configured based on feature amounts extracted by the feature extraction unit 20 from image data that includes only the background (background image data) obtained by the image obtaining unit 10 (background feature amount storage processing).

A determination result storage unit 50 stores, for each partial region, the result of determination by the first object region determination unit 30. A model update unit 60 updates background models stored in the background model storage unit 40 based on the results of determination by the first object region determination unit 30 and a second object region determination unit 80 that will be described below. A statistic calculation unit 70 calculates a statistic based on a plurality of determination results stored in the determination result storage unit 50.

The second object region determination unit 80 determines whether a partial region determined as being an object region by the first object region determination unit 30 is an object region or disturbance based on the statistic calculated by the statistic calculation unit 70. A parameter storage unit 90 stores, for each partial region, a parameter that is used by the second object region determination unit 80 for determination.

An object region output unit 100 outputs the result of determination by the second object region determination unit 80. An instruction unit 110 sets a range that does not include an object serving as the detection target in image data obtained by the image obtaining unit 10. A statistic storage unit 120 stores a statistic calculated by the statistic calculation unit 70. A parameter deciding unit 130 decides parameters to be used by the second object region determination unit 80 based on statistics stored in the statistic storage unit 120. An image storage unit 200 stores an image obtained by the image obtaining unit 10.

Below is a description of various operations according to the present embodiment. First is a description of the flow of processing performed when parameter setting is performed with reference to the flowchart in FIG. 2.

First, in step S101, the image obtaining unit 10 obtains image data captured by an image capturing unit such as a video camera. The image storage unit 200 stores a predetermined number of frames worth of the obtained image data.

In step S102, the instruction unit 110 obtains a parameter setting period instructed by a user. In step S101, the image data stored in the image storage unit 200 is displayed on a display apparatus (not shown). The user looks at the displayed image data and instructs, as a parameter setting period, the starting and ending time of a range in which a detection target is not captured. Specifically, background image data is selected by the user (selection acceptance processing). The instruction unit 110 stores the designated period in an internal memory. Note that if capturing is performed in the state in which a detection target clearly does not exist, the instruction of the range after capturing given from the user as described above is unnecessary.

Next, in step S103, background models are initialized based on the image data stored in the image storage unit 200. First, the feature extraction unit 20 obtains partial region images from image data of the first frame stored in the image storage unit 200. For example, image data is divided into 8×8 pixel blocks, and a partial region image is obtained for each block. Then, a feature amount of each partial region image is extracted. In the present embodiment, a luminance average value, which is the simplest, is used as a feature amount. Alternatively, a histogram of luminance values of pixels in a partial region image may be used as a feature amount, or RGB values or an edge direction histogram may be used as a feature amount. Also, a portion of Discrete Cosine Transform (DCT) coefficients, which are output values obtained by performing DCT processing on a partial region image, may be used as a feature amount. Then, the model update unit 60 generates a background model for each partial region based on the feature amount extracted by the feature extraction unit 20, and stores the generated models in the background model storage unit 40. Specifically, the luminance average value extracted for each partial region by the feature extraction unit 20 is stored as a background model. The above processing is repeatedly performed in sequence for the predetermined number of frames.

Note that processing to be performed on the second frame and the following frames by the model update unit 60 is processing for updating background models that have been already generated. Specifically, weighted addition is performed on the feature amount extracted by the feature extraction unit 20 and the feature amount of the corresponding partial region stored in the background model storage unit 40. Basically, an image does not change in a scene in which the detection target is not captured, and thus similar feature amounts are extracted in each partial region. Accordingly, the background models do not greatly vary when being updated. However, the case in which the background varies cannot be handled, and thus a configuration may be adopted in which a plurality of background models are provided for each partial region in the case in which a feature amount of a background model greatly varies.

In step S104, the first object region determination unit 30 compares, for each partial region, the feature amount extracted by the feature extraction unit 20 with the background model stored in the background model storage unit 40, and determines whether or not the partial region whose feature amount has been extracted is an object region. Here, object region determination is performed based on image data captured at a time later than that of the image data used for background model initialization in the processing in step S103. The first object region determination unit 30 calculates the absolute value of a difference between the feature amount extracted by the feature extraction unit 20 and the feature amount of the corresponding partial region stored in the background model storage unit 40, and compares the result thereof with a predetermined threshold value. The first object region determination unit 30 determines that the partial region is an object region if the result is greater than or equal to the threshold value, and determines that the partial region is a background region if the result is smaller than the threshold value. Then, one of binary values is stored for each partial region in the determination result storage unit 50, namely, "1" is stored if it is determined that the partial region is an object region, and "0" is stored if it is determined that the partial region is a background region. Further, at this time, the model update unit 60 updates a background model according to the result of determination by the first object region determination unit 30. Specifically, if it is determined that the partial region is a background region, the background model is updated using the image of that region, with the same method as that described in step S103.

The above processing is repeatedly performed in sequence, and the determination result storage unit 50 stores the result of determination by the first object region determination unit 30 for each partial region in time series. Note that since an image that does not include an object serving as the detection target is instructed by the instruction unit 110, any determination results here indicating that a partial region is an object region are all the result of incorrect determination.

Figures 2, 3A, 3B:
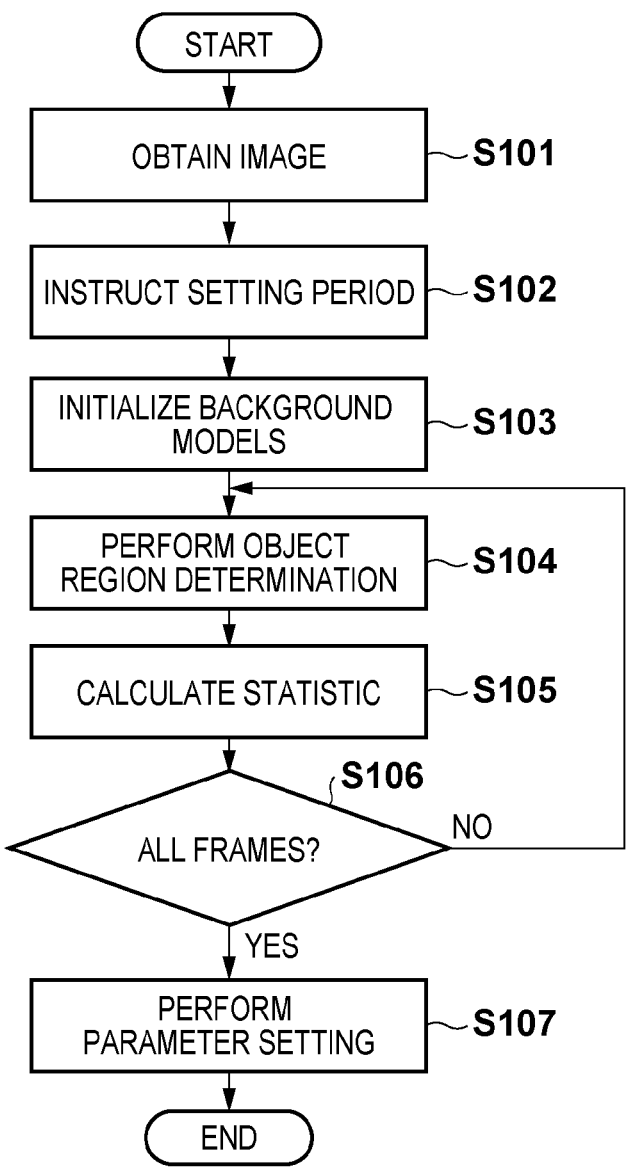
FIG. 2 is a flowchart showing processing performed when parameter setting is performed according to the first embodiment.
FIGS. 3A and 3B are diagrams showing examples of results of determination by a first object region determination unit.

In step S105, the statistic calculation unit 70 calculates a statistic based on the determination results of a plurality of frames stored in the determination result storage unit 50. In the present embodiment, the continuous results of object region determination for the predetermined number of frames are obtained from the determination result storage unit 50 for each partial region, and a continuous time period (the number of continuous frames) for which the determination result indicating an object region continues in the period of the frames is calculated as a statistic. For example, when the determination results of ten continuous frames have been obtained, the continuous time period of an object region, namely, the value stored as "1", is output. Examples of this are shown in FIGS. 3A and 3B. The numerical values in FIGS. 3A and 3B indicate the results of object region determination for ten frames of a certain partial region, where "1" indicates a determination result indicating an object region, and "0" indicates a determination result indicating a background region. FIG. 3A shows examples of determination results in a region in which an incorrect determination is likely to be made due to disturbance, such as ripples on the water surface, and FIG. 3B shows examples of determination results in an ordinary stable background region. Here, in the case of FIG. 3A, the continuous time period "2" is output once, and the continuous time period "1" is output three times as statistics. Further, a statistic is not output in the case of FIG. 3B. The statistic calculation unit 70 sequentially calculates statistics in accordance with the progress of processing performed by the first object region determination unit 30, and stores the statistics in the statistic storage unit 120.

The object region determination processing in step S104 and the statistic calculation processing in step S105 are repeatedly performed in sequence for the number of frames corresponding to the period instructed in step S102. Specifically, in step S106, it is determined whether or not processing has been performed on all frames. If it is determined that processing has been performed on all frames (step S106: YES), the procedure proceeds to step S107. On the other hand, if it is determined that processing has not been performed on all frames (step S106: NO), the procedure returns to step S104, and processing is performed on the next frame.

In step S107, the parameter deciding unit 130 decides parameters to be used by the second object region determination unit 80 based on the statistics stored in the statistic storage unit 120. In the present embodiment, a parameter is decided for each partial region based on a histogram of continuous time periods stored in the statistic storage unit 120. First, the histogram of continuous time periods is normalized. Since the continuous time periods are obtained based on the results of object region determination for ten frames in the present embodiment, the count values of the continuous time periods are each converted into a percentage, such that the sum total of count values corresponding to continuous time periods 1 to 10 is 1. Then, it is determined whether the percentage is greater than a predetermined value, or less than or equal to the predetermined value. Then, the longest continuous time period whose percentage exceeds the predetermined value is stored as a parameter in the parameter storage unit 90, for each partial region. A parameter is obtained such that the range in which the percentage occupied by a continuous time period is greater than the predetermined value is determined as being "disturbance" in the processing performed by the second object region determination unit 80 described later. In this way, an incorrect determination pattern that frequently occurs in a short time can be suppressed for each region. In other words, here, an incorrect determination pattern is regarded as a continuous time period in which an incorrect determination is made.

Figure 4:
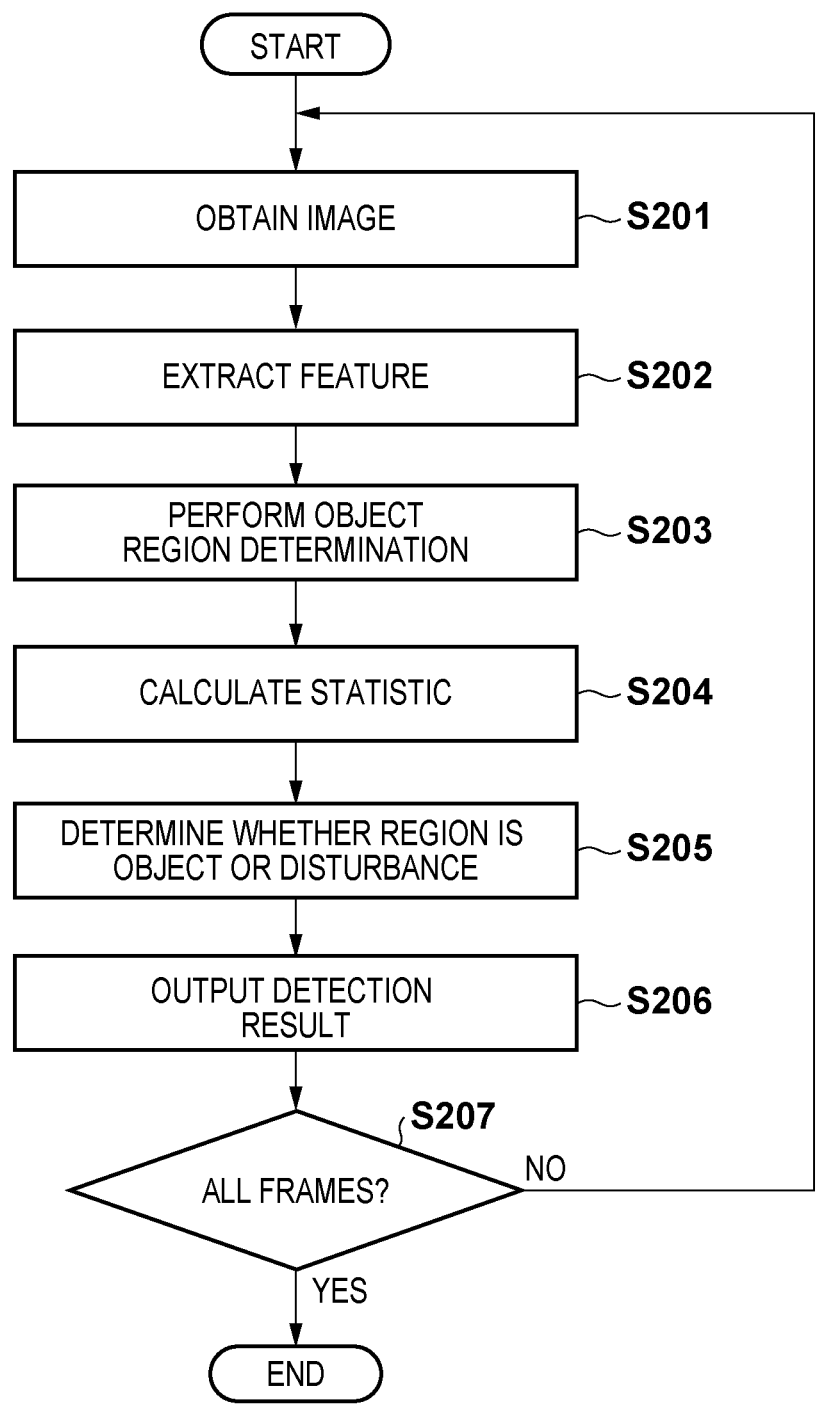
FIG. 4 is a flowchart showing object detection processing according to the first embodiment.

Next is a description of the flow of object detection processing with reference to the flowchart in FIG. 4.

In step S201, the image obtaining unit 10 obtains image data, and the obtained image data is stored in the internal memory of the image obtaining unit 10.

In step S202, the feature extraction unit 20 extracts, for each partial region, a feature amount from the image data obtained by the image obtaining unit 10. When feature extraction is performed on the image data stored in the image obtaining unit 10, the processing that is performed here is the same as the above-described processing performed in parameter setting.

In step S203, the first object region determination unit 30 compares the feature amount extracted by the feature extraction unit 20 with the background model stored in the background model storage unit 40, and determines whether or not the partial region whose feature amount has been extracted is an object region. The processing performed here is the same as that in step S104 when parameter setting is performed.

In step S204, the statistic calculation unit 70 calculates a statistic from a plurality of determination results stored in the determination result storage unit 50. Although the processing performed here is the same as the above-described processing in step S105 when parameter setting is performed, the calculated statistic is output to the second object region determination unit 80.

In step S205, the second object region determination unit 80 determines, based on the statistic calculated by the statistic calculation unit 70, whether or not the partial region determined by the first object region determination unit 30 as being an object region is an object region or disturbance. Specifically, if the continuous time period for object determination obtained by the statistic calculation unit 70 exceeds the parameter obtained when parameter setting is performed and stored in the parameter storage unit 90, the second object region determination unit 80 determines that the region is not "disturbance", but rather a "target object". The determination result is stored for each partial region in a memory in the second object region determination unit 80 as a binary image in which an object region is expressed by "1", and a background region including disturbance is expressed by "0" as in the case of the first object region determination unit 30. Further, at this time, the model update unit 60 updates the background model according to the determination result obtained by the second object region determination unit 80.

In step S206, the object region output unit 100 outputs the result of determination by the second object region determination unit 80. For example, the binary image expressing an object region stored in the second object region determination unit 80 is superimposed on image data, and the resultant data is displayed on a display.

The processing from steps S201 to S206 is controlled by a control unit (not shown) so as to be repeatedly performed in sequence for each frame. Specifically, in step S207, it is determined whether or not processing has been performed on all frames. If it is determined that processing has been performed on all frames (step S207: YES), the procedure ends. On the other hand, if it is determined that processing has not been performed on all frames (step S207: NO), the procedure returns to step S201.

As described above, in the present embodiment, statistics are obtained based on the results of a plurality of frames incorrectly determined as being an object region from an image that does not include an object serving as the detection target, and parameters for distinguishing between an object and disturbance are decided. Then, object region determination is performed using the decided parameters. An incorrect determination due to disturbance can be suppressed using such a configuration.

Second Embodiment

The present embodiment describes an example in which a second feature amount is extracted from a plurality of results of determination by the object region determination unit, and a parameter is decided for distinguishing between an object and disturbance by machine learning based on a second feature amount extracted from an image that does not include an object serving as the detection target.

Figure 5:
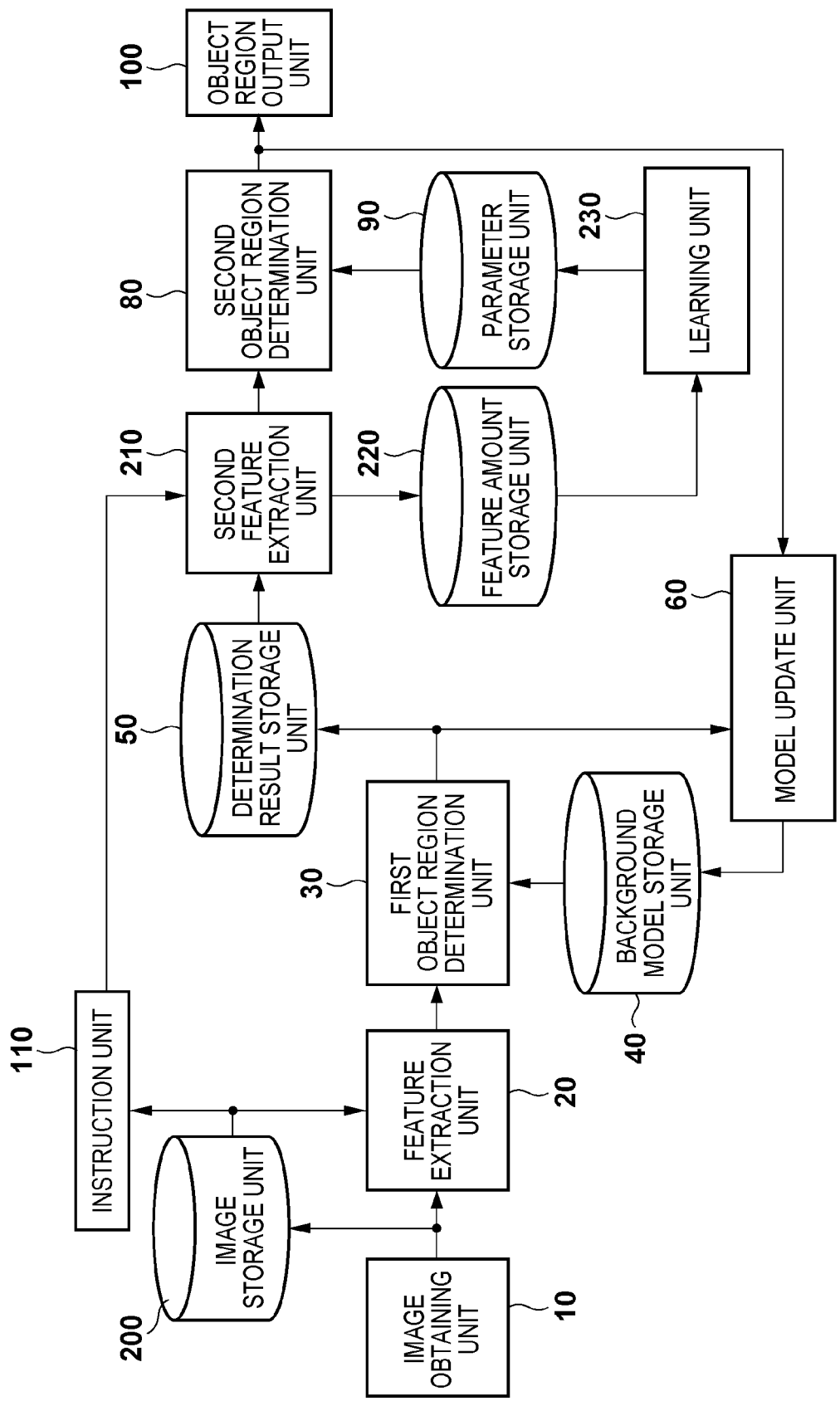
FIG. 5 is a diagram showing a functional configuration of an object detection apparatus according to a second embodiment.

A functional configuration of an object detection apparatus according to the present embodiment will be described below with reference to FIG. 5. In the present embodiment, a second feature extraction unit 210, a feature amount storage unit 220, and a learning unit 230 are used, respectively replacing the statistic calculation unit 70, the statistic storage unit 120, and the parameter deciding unit 130 in the first embodiment.

The second feature extraction unit 210 extracts a second feature amount from a plurality of determination results stored in the determination result storage unit 50. The feature amount storage unit 220 stores the second feature amount extracted by the second feature extraction unit 210. The learning unit 230 decides, by machine learning, a parameter to be used by the second object region determination unit 80 based on the second feature amount stored in the feature amount storage unit 220.

Below is a description of various operations according to the present embodiment. First is a description of the flow of processing performed when parameter setting is performed, with reference to the flowchart in FIG. 6. The processing other than that in steps S305 and S307 in FIG. 6 and step S404 in FIG. 7 described below is the same as the corresponding processing in FIGS. 2 and 4 described in the first embodiment. Below is a detailed description of differences from the first embodiment.

Figure 6:
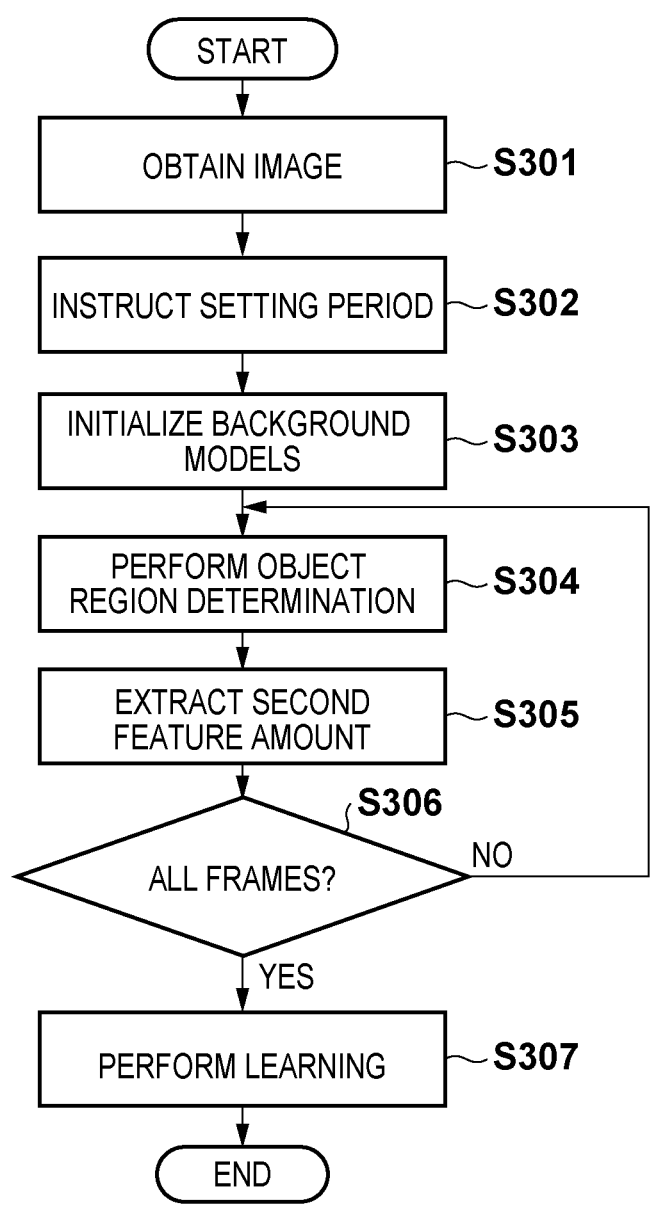
FIG. 6 is a flowchart showing processing performed when parameter setting is performed according to the second embodiment.

The flow of parameter setting processing according to the present embodiment will be described next with reference to FIG. 6. In step S301, the image obtaining unit 10 obtains image data captured by an image capturing unit such as a camera.

In step S302, the instruction unit 110 obtains, as a parameter setting period, a user-instructed range in which a detection target is not captured. Next, in step S303, background models are initialized based on the image data stored in the image storage unit 200.

In step S304, the first object region determination unit 30 compares a feature amount extracted by the feature extraction unit 20 with the background model stored in the background model storage unit 40, and determines whether or not the partial region whose feature amount has been extracted is an object region.

In step S305, the second feature extraction unit 210 extracts a second feature amount based on the determination results of a plurality of frames stored in the determination result storage unit 50. In the present embodiment, the continuous results of object region determination for the predetermined number of frames are obtained for each partial region from the determination result storage unit 50, the object determination results in the period of the frames are combined, and the combined result is extracted as a feature vector. For example, if the object determination results shown in FIG. 3A are obtained, the determination results of the frames are combined, and a vector (0, 1, 0, 1, 1, 0, 1, 0, 1, 0) is used as a feature amount. Alternatively, this vector may be handled as a binary value, and a 10-bit binary pattern "0101101010" may be used as a second feature amount. The second feature extraction unit 210 sequentially extracts a feature amount in accordance with the progress of the processing performed by the first object region determination unit 30, and stores the extracted feature amounts in the feature amount storage unit 220. Note that a feature amount that does not include an object determination result of "1" will not be output.

The object region determination processing in step S304 and the second feature amount extraction processing in step S305 are repeatedly performed in sequence for the number of frames corresponding to the period instructed in step S302. Thus, in step S306, it is determined whether or not processing has been performed on all frames. If it is determined that processing has been performed on all frames (step S306: YES), the procedure proceeds to step S307. On the other hand, if it is determined that processing has not been performed on all frames (step S306: NO), the procedure returns to step S304.

In step S307, the learning unit 230 decides, by machine learning, a parameter to be used by the second object region determination unit 80 based on the second feature amount stored in the feature amount storage unit 220. Specifically, machine learning is performed using, as a teacher sample of a disturbance class, a feature vector stored in the feature amount storage unit 220 that is an incorrect determination pattern obtained from the frames that do not include an object serving as the detection target, thereby obtaining a parameter. For example, learning is performed using one-class support vector machine (SVM). Learning is performed using linear SVM, and a weight vector and a threshold value that are obtained are output as parameters, and stored in the parameter storage unit 90. Note that the method of machine learning is not limited to one-class SVM, and for example, principal component analysis may be performed on a sample of a disturbance class, and pattern recognition using a characteristic vector may be performed.

Figure 7:
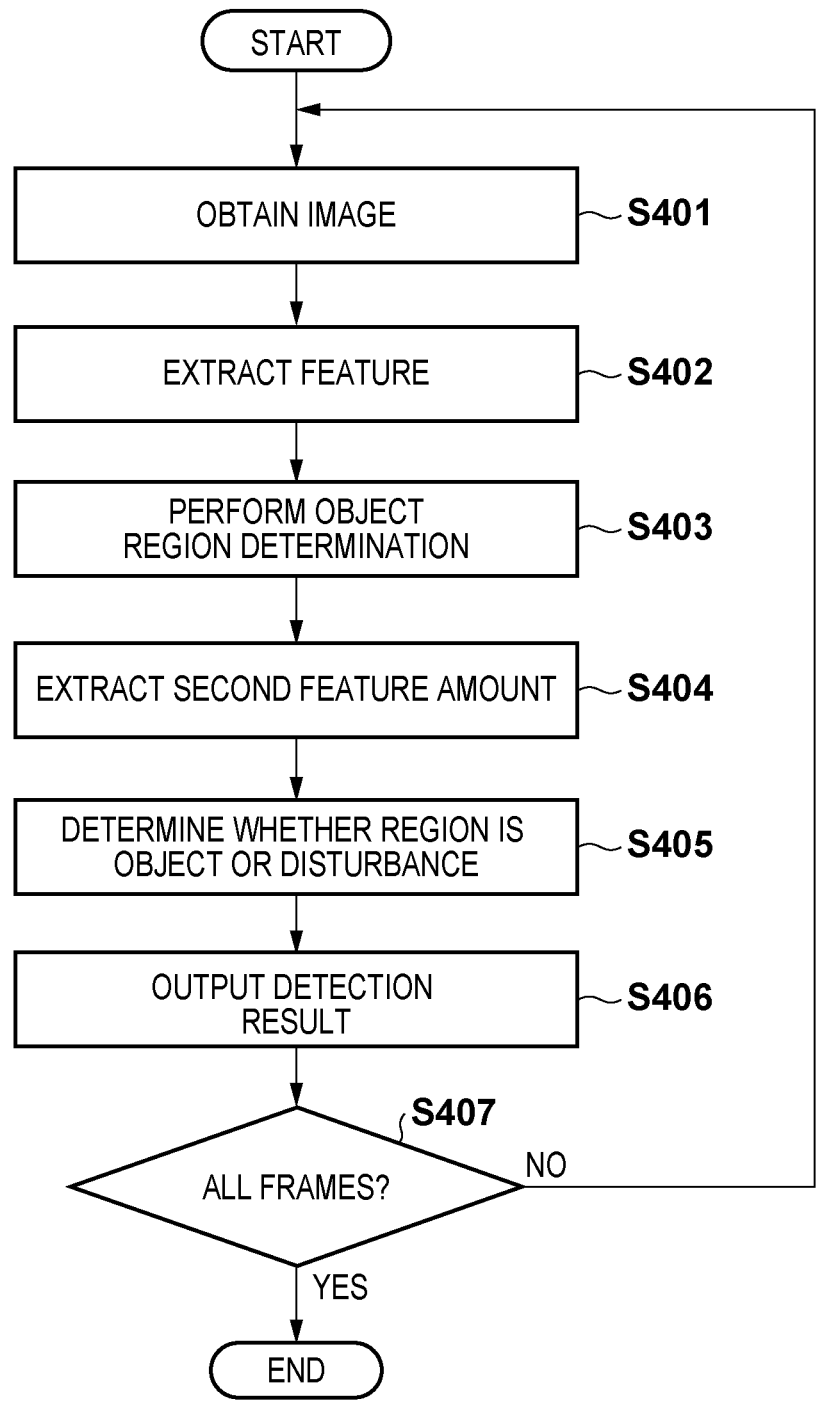
FIG. 7 is a flowchart showing object detection processing according to the second embodiment.

Next is a description of the flow of object detection processing with reference to the flowchart in FIG. 7. In step S401, the image obtaining unit 10 obtains image data. In step S402, the feature extraction unit 20 extracts, for each partial region, a feature amount from the image data obtained by the image obtaining unit 10.

In step S403, the first object region determination unit 30 compares the feature amount extracted by the feature extraction unit 20 with the background model stored in the background model storage unit 40, and determines whether or not the partial region whose feature amount has been extracted is an object region.

In step S404, the second feature extraction unit 210 extracts a second feature amount based on a plurality of determination results stored in the determination result storage unit 50.

In step S405, the second object region determination unit 80 determines, based on the feature amount extracted by the second feature extraction unit 210, whether or not the partial region determined as being an object region by the first object region determination unit 30 is an object region or disturbance. Specifically, the second object region determination unit 80 calculates an inner product of the feature vector obtained by the second feature extraction unit 210 and the weight vector stored in the parameter storage unit 90. Then, the second object region determination unit 80 compares the calculation result thereof with the threshold value stored in the parameter storage unit 90, and determines that the region is not "disturbance", but rather an "object" if the result exceeds the threshold value. The determination result is stored in a memory in the second object region determination unit 80 as in the first embodiment.

In step S406, the object region output unit 100 outputs the result of determination by the second object region determination unit 80.

The processing from steps S401 to S406 is controlled by a control unit (not shown) so as to be repeatedly performed in sequence for each frame. Thus, it is determined in step S407 whether or not processing has been performed on all frames. If it is determined that processing has been performed on all frames (step S407: YES), the procedure ends. On the other hand, if it is determined that processing has not been performed on all frames (step S407: NO), the procedure returns to step S401.

As described above, in the present embodiment, the second feature extraction unit 210 extracts a second feature amount from a plurality of results of determination by the first object region determination unit. Then, a parameter for distinguishing between an object and disturbance is decided by machine learning based on the second feature amount extracted from an image that does not include an object serving as the detection target. Moreover, an object region is determined using the decided parameter. In this way, incorrect determination due to disturbance can be suppressed.

Note that although a feature amount is extracted from frames captured at different times using the results of determination by the first object region determination unit in the present embodiment, the present invention is also applicable to the disturbance determination method proposed by Dalley, Migdal and Grimson in "Background Subtraction, for Temporally Irregular Dynamic Textures", Workshop on Applications of Computer Vision, January 2008. Specifically, the first object region determination unit 30 makes a determination by comparing the feature amount extracted by the feature extraction unit 20 with not only that of a background model of a corresponding partial region, but also that of a neighboring background model. Then, the second feature extraction unit 210 extracts, also using the result of determination by comparison with the neighboring background model, a feature vector obtained by combining these results.

Further, a method is conceivable in which instead of performing determination by comparison with a neighboring background model, disturbance determination is performed based on a determination by comparison with background models of different resolutions. For example, assuming that one pixel is the smallest unit of a partial region, a background model corresponding thereto is created when initialization is performed, and a comparison with the background model is performed. Moreover, a comparison with a background model for a partial region that is an 8×8 pixel block, and a comparison with a background model for a partial region that is a 16×16 pixel block are also performed in parallel. Then, disturbance determination is performed using a feature vector obtained by combining the results of determination using a plurality of models having different resolutions.

Specifically, the feature extraction unit 20 extracts feature amounts for a plurality of resolutions from partial regions of a plurality of sizes in an image. Then, the background model storage unit 40 stores background models for a plurality of resolutions corresponding to the partial regions of a plurality of sizes. Further, for each partial region, the first object region determination unit 30 compares feature amounts extracted by the feature extraction unit 20 with background models for the plurality of resolutions, and performs object region determination. Then, the second feature extraction unit 210 extracts a feature vector obtained by combining the determination results thereof.

Note that a method of determination by comparison with a neighboring background model or determination using a plurality of resolutions is applicable not only to the parameter determination by machine learning described in the present embodiment, but also to the method described in the first embodiment.

Third Embodiment

As an applied configuration of the embodiments described above, the present invention is also applicable to a monitoring camera system constituted by a monitoring camera and a monitoring server connected via a network. Here, the monitoring server has a function of recording an image captured by the monitoring camera and performing monitoring. For example, the constituent elements described in the first or second embodiment are incorporated in the monitoring server, and processing described in the first or second embodiment is performed on image data captured by the monitoring camera. Alternatively, a configuration is possible in which the constituent elements described in the first or second embodiment are incorporated in the monitoring camera, the detection result is transmitted to the monitoring server together with the image data captured by the monitoring camera, and the transmitted result and data are recorded. Further, a configuration is also possible in which the constituent elements necessary for the operation performed when parameter setting is performed described in the first or second embodiment are provided in the monitoring server, parameter setting processing is performed on image data recorded in the monitoring server, and the monitoring camera performs detection processing. In this case, the constituent elements necessary for the operation in the object detection processing described in the first or second embodiment are provided in the monitoring camera, parameters are received from the monitoring server, and the monitoring camera performs detection processing. For example, it is sufficient to decide parameters when the monitoring camera is installed.

According to the present invention, it is possible to precisely distinguish between an object and disturbance by setting optimal parameters for the scene in which the camera is installed.

Moreover, even if various incorrect detection factors are mixed in one shooting scene, it is possible to precisely distinguish between an object and disturbance by deciding such a parameter for each partial region of an image and distinguishing between an object and disturbance.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-232786 filed on Oct. 15, 2010, which is hereby incorporated by reference herein in its entirety.

What is claimed is:

1. An object detection apparatus that detects a target object from image data, the apparatus comprising:
    an image obtaining unit adapted to obtain image data by sequentially capturing an image in a predetermined direction from a predetermined viewpoint;
    a feature extraction unit adapted to extract a feature amount for each of partial regions that constitute the image data obtained by the image obtaining unit;
    a storage unit adapted to store, as a background feature amount for each of the partial regions, a feature amount extracted in advance by the feature extraction unit from background image data that has been obtained by the image obtaining unit and does not include the target object;
    a first object region determination unit adapted to determine, for each of the partial regions, whether or not the partial region is an object region including the target object by comparing a current feature amount extracted from the partial region by the feature extraction unit with the background feature amount;
    a statistic calculation unit adapted to calculate, for each of the partial regions, a statistic of determination within a period by the first object region determination unit, based on determination results by the first object region determination unit within the period;
    a parameter deciding unit adapted to decide a parameter for each of the partial regions based on a statistic of incorrect determination calculated by the statistic calculation unit within a parameter setting period in which the partial region does not include the target object but is incorrectly determined as the object region by the first object region determination unit; and
    a second object region determination unit adapted to determine, for each of the partial regions determined as the object region by the first object region determination unit within a detection period in which the object would be detected, whether the partial region is the object region or a disturbance, based on the parameter decided by the parameter deciding unit and the statistic of determination within the detection period calculated by the statistic calculation unit.

2. The object detection apparatus according to claim 1, wherein the statistic calculation unit calculates, for each of the partial regions, the statistic of determination from determination results of a plurality of frames including a partial region determined as being the target object from the background image data by the first object region determination unit.

3. The object detection apparatus according to claim 1, wherein the statistic of determination is the number of continuous frames of an object region that have been each determined by the first object region determination unit.

4. The object detection apparatus according to claim 1, further comprising:
    a parameter storage unit adapted to store, for each of the partial regions, the parameter decided by the parameter deciding unit.

5. The object detection apparatus according to claim 1, further comprising:
    a second feature extraction unit adapted to extract, for each of the partial regions, a second feature amount that indicates whether or not the partial region is the object region, based on a plurality of results of the determination by the first object region determination unit,
    wherein the parameter deciding unit decides in advance, for each of the partial regions, the parameter by machine learning based on the second feature amount, and
    the second object region determination unit determines, for each of the partial regions, whether or not the partial region is the object region based on the parameter and the second feature amount.

6. The object detection apparatus according to claim 5, wherein the second feature extraction unit calculates, for each of the partial regions, the second feature amount based on a plurality of determination results including a partial region determined as being the object region from the background image data by the first object region determination unit.

7. The object detection apparatus according to claim 5, wherein the second feature amount is a feature vector obtained by combining the plurality of results of determination by the first object region determination unit.

8. The object detection apparatus according to claim 1, comprising:
    a selection acceptance unit adapted to accept selection of the background image data that does not include the target object.

9. A monitoring camera system comprising the object detection apparatus according to claim 1 and a monitoring camera,
    wherein the parameter deciding unit of the object detection apparatus decides the parameter when the monitoring camera is installed.

10. An object detection apparatus that detects a target object from image data, the apparatus comprising:
    an image obtaining unit adapted to obtain image data by capturing an image in a predetermined direction from a predetermined viewpoint;
    a feature extraction unit adapted to extract feature amounts for a plurality of resolutions from partial regions of a plurality of sizes, for each of partial regions that constitute the image data obtained by the image obtaining unit;
    a storage unit adapted to store, as background feature amounts for each of the partial regions, feature amounts for the plurality of resolutions corresponding to the partial regions of the plurality of sizes on which extraction has been performed by the feature extraction unit from background image data that has been obtained by the image obtaining unit and does not include the target object;

a first object region determination unit adapted to determine, for each of the partial regions, whether or not the partial region is an object region including the target object by respectively comparing the feature amounts of the partial regions for the plurality of resolutions with the background feature amounts of the partial regions for the corresponding resolutions stored in the storage unit;

a parameter deciding unit adapted to decide a parameter for each of the partial regions based on a plurality of results of determination by the first object region determination unit; and a second object region determination unit adapted to determine, for each of the partial regions, whether or not the partial region is the object region based on the parameter decided by the parameter deciding unit and the results of determination by the first object region determination unit.

11. An object detection method for an object detection apparatus that detects a target object from image data, the method comprising:

an obtaining step of obtaining image data by sequentially capturing an image in a predetermined direction from a predetermined viewpoint;

an extracting step of extracting a feature amount for each of partial regions that constitute the image data obtained in the obtaining step;

a storing step of storing, as a background feature amount for each of the partial regions, a feature amount extracted in advance in the feature extraction from background image data that has been obtained in the obtaining step and does not include the target object;

a first determining step of determining, for each of the partial regions, whether or not the partial region is an object region including the target object by comparing a current feature amount extracted from the partial region in the extracting step with the background feature amount;

a statistic calculation step of calculating, for each of the partial regions, a statistic of determination within a period by the first object region determination step, based on determination results by the first object region determination step within the period;

a parameter deciding step of deciding a parameter for each of the partial regions based on a statistic of incorrect determination calculated by the statistic calculation step within a parameter setting period in which the partial region does not include the target object but is incorrectly determined as the object region by the first object region determination step; and a second determining step of determining, for each of the partial regions determined as the object region by the first object region determination step within a detection period in which the object would be detected, whether the partial region is the object region or a disturbance, based on the parameter decided in the deciding step and the statistic of determination within the detection period calculated in the statistic calculation step.

12. A computer-readable non-transitory storage medium storing a computer program for causing a computer to execute the steps of the object detection method according to claim 11.

* * * * *